Patented Jan. 7, 1941

2,228,164

UNITED STATES PATENT OFFICE 2,228,164

GYPSUM PLASTER

Dean D. Crandell, Buffalo, N. Y., assignor to National Gypsum Company, Buffalo, N. Y.

No Drawing. Application February 10, 1937, Serial No. 125,092

5 Claims. (Cl. 106—34)

This invention relates to gypsum plaster and particularly to a gypsum plaster that has been stabilized so that the setting time thereof is substantially independent of extraneous conditions encountered in its use.

As generally understood, gypsum plaster is calcium sulfate hemi-hydrate obtained by heating or calcining gypsum rock at a comparatively low temperature. Gypsum plaster is relatively soluble in water and when gauged therewith reacts chemically with the water to produce calcium sulfate dihydrate, a product less soluble than gypsum plaster, and when the gauged mixture is permitted to stand, a hard, set product of calcium sulfate dihydrate is produced. Gypsum plaster is generally used admixed with sand or other aggregate, or may even be used neat, for application to various types of lath for wall production in the building industry.

It is a characteristic of gypsum plaster that the time of set of the plaster is influenced by many conditions, as, for instance, the type of water used, the condition of the box in which the mixture is made, that is to say, whether the box be dirty and contain fragments of set or unset plaster from a previous mix, the type of sand. One factor which particularly affects the time of set of a retarded plaster is the quantity of sand admixed with the plaster. These extraneous conditions all influence the setting time of the plaster, and in many instances cause the plaster to set or harden so rapidly that it cannot be worked or troweled. That is to say, these conditions speed up or aid the formation of the dihydrate from plaster and the rapid crystallization or precipitation of the dihydrate from the mix. In the use of gypsum plaster it is disadvantageous to use a plaster on the job which will not, under job conditions, possess a substantially constant setting time, since the use of plaster is facilitated by knowing the approximate time required for the plaster to set and, therefore, the approximate quantity of mix that can be made up advantageously at one time. Where a fluctuating or non-constant setting time is inherent in the plaster mix as made on the job, uniform results of application and troweling are difficult of attainment.

As calcined gypsum sets in a few minutes, it has been common practice heretofore to add what is known as commercial retarder to gypsum plaster in an attempt to delay the setting time of the plaster. However, the amount of retarder is added in substantially constant quantity and a gypsum plaster made therewith will not possess a substantially constant setting speed under job conditions but will fluctuate in substantially the same way as gypsum plaster to which no retarder has been added, but to a slightly lesser degree.

It is an object of the present invention to produce a gypsum plaster which is stabilized against job conditions and which possesses a substantially constant setting time irrespective of the amount of aggregate, the kind of aggregate, the conditions of the mixing box, the type of water used for gauging the mixture or plaster, the temperature conditions, or the age of the plaster.

It is another object of the present invention to produce a gypsum plaster that is stabilized as to setting time and wherein the time of set of the neat plaster when gauged with water is substantially the same as that of a plaster mix where the gypsum plaster has had aggregate, such as sand and the like, added to it, in amounts generally used and under conditions generally encountered in the building trade.

The set stabilized gypsum plaster of the present invention comprises calcined gypsum, commercial retarder and magnesium sulfate, the two latter constituents being present in very small proportion, but in quantities sufficient to stabilize the time of set. In general, the time of set is regulated to about 5 to 8 hours, although longer times may be advantageous, provided a set is obtained before the plaster dries out.

As an example of a composition that has been found eminently suitable as a stabilized plaster may be mentioned a composition wherein for each 2,000 pounds of stucco or calcined gypsum about 13 to 16 pounds of magnesium sulfate and 6 to 10 pounds of commercial retarder are present. This composition is stabilized as to time of set and the generally used composition of one part of plaster to two parts of aggregate will set up under working conditions in substantially the same time required for the mixture to set when entirely clean apparatus is used in its preparation.

In the following table is set forth the setting time of neat plaster and plaster and sand mixture as encountered under job conditions compared with the time of set when clean apparatus is used in making a mix. The composition of plaster used was 15 pounds of magnesium sulfate and 6 pounds of commercial retarder per 2,000 pounds of calcined gypsum.

| Parts by weight of improved plaster to sand | Time of set |
|---|---|
| | Hours |
| 1-0 | 5$\frac{2}{3}$ |
| 1-1 | 5$\frac{1}{4}$ |
| 1-2 | 5$\frac{1}{4}$ |
| 1-3 | 4$\frac{3}{4}$ |
| Clean test | 4$\frac{3}{4}$ |

When it is recalled that a job set for a plaster mixture containing approximately 7 pounds commercial retarder per ton would be approximately 15 hours and this time would decrease upon addition of said in substantial proportion to the amount of sand added until a time of setting of approximately 4 hours would be obtained on a 1-3 mixture, it will be seen that with a composition of plaster recommended above, job sets are obtained that are substantially constant as to time as a variation of an hour to an hour and a half is considered to be a substantially constant set when dealing with plaster and plaster mixes. This same composition of plaster after 30 days gave a setting time for neat plaster of 5½ hours and for a 1-2 mix of 5¼ hours, showing substantial elimination of aging upon standing.

Another grade of calcined plaster having per ton of plaster about 1.1% of set stabilizing ingredients as follows, 15 pounds of magnesium sulfate and 7 pounds of commercial retarder possessed setting characteristics as follows:

| Parts of improved plaster to sand | Time of set |
|---|---|
| | Hours |
| 1 plaster:0 sand | 7¼ |
| 1 plaster:1 sand | 8½ |
| 1 plaster:2 sand | 6¾ |
| 1 plaster:3 sand | 6½ |
| Clean test | 7¾ |

From the foregoing it will be seen that the improved plaster, containing about 1 to 2% of set stabilizing ingredients as follows, magnesium sulfate about 13 to 16 parts, commercial retarder 6 to 9 pounds per ton of plaster, may be used neat or mixed with aggregate and produce a plastic mix which possesses substantially a uniform time of set and which is not so retarded in setting time as to dry out before crystallization begins. Calcined gypsum and sand alone, when gauged with water, sets in about 15 minutes, while neat raw plaster sets in about 35 to 40 minutes as contrasted with plaster alone containing about 6 pounds of retarder which sets in about two days and in many instances drys out before setting. It is substantially impossible, therefore, to produce a retarded plaster retarded with commercial retarders, i. e., glue, glue-lime and other nitrogeneous substances, which will have a constant time of setting under all conditions encountered in use. The plaster of the present invention sets in less than about 20 hours and not before 2 hours after mixing with water.

From the foregoing it will be seen that the present invention provides a plaster stabilized against disturbance by extraneous conditions encountered upon the job.

I claim:

1. Set stabilized gypsum plaster which comprises calcined gypsum and a set stabilizing agent in amount sufficient to stabilize the time of set of the calcined gypsum, the set stabilizing agent comprising essentially magnesium sulfate and a retarder.

2. Set stabilized gypsum plaster which comprises calcined gypsum and a set stabilizing agent in amount sufficient to stabilize the time of set of the calcined gypsum, said agent including magnesium sulfate said resultant plaster having a time of set in excess of two hours and less than 20 hours.

3. Set stabilized gypsum plaster which comprises calcined gypsum and a set stabilizing agent in amount sufficient to stabilize the time of set of the calcined gypsum, the set stabilizing agent comprising magnesium sulfate and a commercial retarder, the former being in excess of the latter.

4. Set stabilized gypsum plaster which comprises calcined gypsum and less than about 2% of a set stabilizing agent comprising essentially magnesium sulfate and a retarder.

5. A gypsum plaster having its setting time substantially stabilized independently of normal amounts or degrees of purity of usual addition agents, comprising calcined gypsum and less than about 2% of a set stabilizing composition comprising a major proportion of magnesium sulfate and a smaller proportion of a retarder.

DEAN D. CRANDELL.